March 27, 1934.   J. L. KEMPTHORNE   1,952,260
ROTARY ENGINE
Filed Dec. 5, 1928
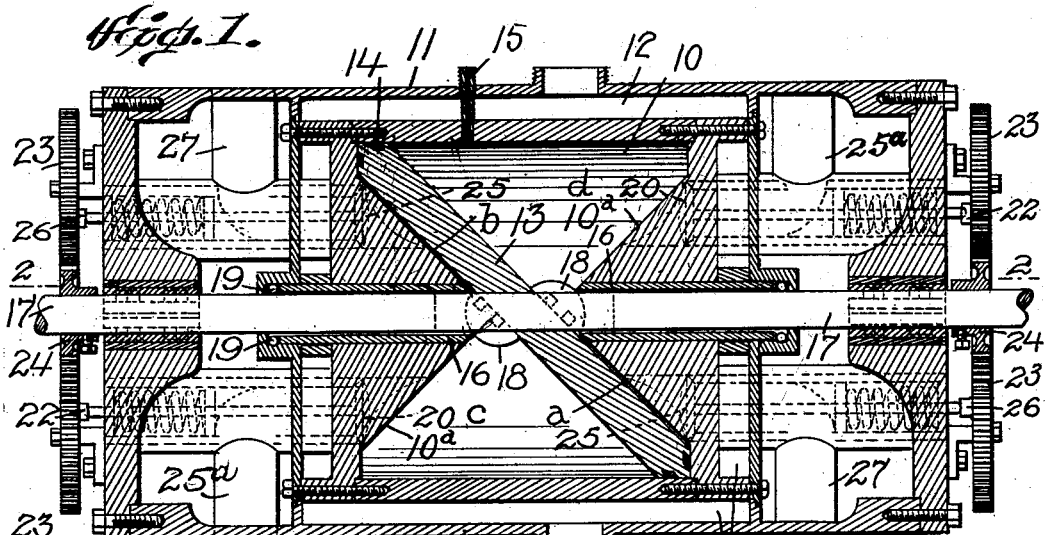
Fig. 1.
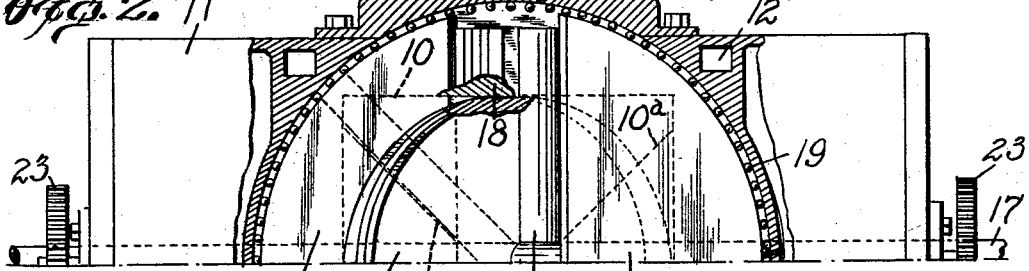
Fig. 2.
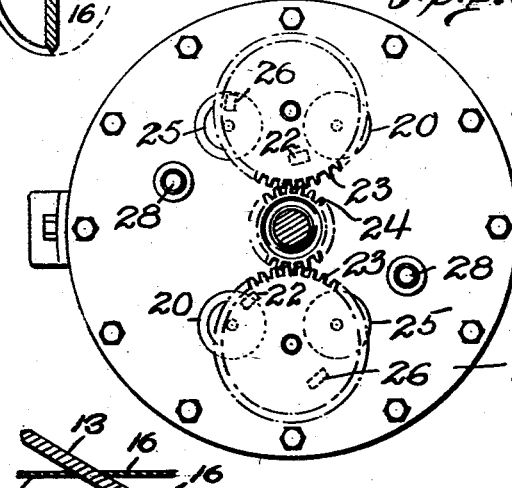
INVENTOR
James L. Kempthorne,
BY
Wm. H. Caufield,
ATTORNEY.

Patented Mar. 27, 1934

1,952,260

UNITED STATES PATENT OFFICE 1,952,260

ROTARY ENGINE

James L. Kempthorne, Maplewood, N. J.

Application December 5, 1928, Serial No. 323,850

6 Claims. (Cl. 123—8)

This invention relates to an engine which can be used as a compressor or pump or as a steam engine or as an internal combustion engine and to furnish a clear description it is described and illustrated in this application as an internal combustion engine.

The engine dispenses with the use of cranks and connecting rods and comprises a cylinder in which a wobble-plate is rotatably fitted, the usual way being to mount the plate on a shaft to readily transmit the power. The cylinder is also equipped with vanes or plates which divide the cylinder longitudinally on both sides of the wobble-plate to form four chambers within the cylinder. Suitable inlet and exhaust ports with valves therein are supplied to each chamber and operated in proper sequence to control the admission and expulsion of liquid into and from the chambers.

The invention is exemplified by the engine shown in the accompanying drawing in which Figure 1 is a vertical section through the engine. Figure 2 is a top view with the centre sectionized on a plane taken on line 2—2 in Figure 1. Figure 3 is an end view of the drawing and Figure 4 is a perspective view of the wobble-plate and the vanes. Figures 5, 6 and 7 are diagrammatic sections showing the wobble plate in the position it will occupy in making a half revolution and also showing the position of the vanes.

In the drawing the cylinder is shown at 10 within the casing 11 and if the engine is water cooled it has the space 12 for the circulation of the water. The cylinder is provided with the wobble-plate 13 that is elliptical in order to fit into the cylinder when inclined relative to the axis of the cylinder and which is rotatably arranged in the cylinder. To make a seal I usually employ the piston rings 14 and lubrication may be accomplished through the feed 15.

Bearing on the wobble-plate and arranged in a plane parallel to the axis of the cylinder are the plates or vanes 16 which divide the cylinder so that, with the wobble-plate, four chambers are provided with constantly changing capacities, as the wobble-plate revolves. The ends of the cylinder are cone-shaped as at 10a to allow a maximum of compression when the wobble-plate, in lieu of a piston, is rotated to positions at the most acute angle to the vanes.

The wobble-plate is shown secured to the shaft 17 in the centre of the cylinder and by this means power can be transmitted and received.

The sealing strips 18 rock in the ends of the vanes and conform to the various angles that the surfaces of the wobble-plate assume in a vertical direction and the vanes swing around in the casing 11 to conform to the horizontal movement necessary to follow the wobble-plate. The vanes can rotate on the balls 19 which are held in suitable retainers. It will be evident that the wobble-plate, the vanes, the sealing strips and the walls of the cylinder form tight joints and the four chambers thus provided are sealed one from the other.

The cylinder walls, the edge of the wobble-plate, the sealing strips and the vanes co-operate to form four leakproof chambers. The wobble-plate engages the walls of the cylinder around the whole circumference or outer edge of the plate. As the fitting of the edge of the wobble-plate is tight against the wall the closure is thus insured at the edge of the wobble-plate where it passes through between the strips 18. In other words the wobble-plate acts as a tight closure against the side walls of the cylinder. This will be apparent from the part broken away in Figure 2 showing the contact between the wobble-plate and the cylinder wall at the portion between the sealing strips.

In using the engine as an internal combustion engine I provide an inlet valve 20 for each chamber, thus making four valves at each end of the engine. The inlet valves are of any desired type and I show the spring closed valves operated by the cams 22 on the gears 23 which are operated from the pinion 24 on the engine shaft. These inlet valves are connected by the connections 25a to a manifold or other fuel supply. The exhaust valves 25, one for each chamber, are similarly operated by cam surfaces 26 and are connected by pipes 27 to an exhaust or muffler. Various other forms of operating devices for the valves can be used so long as the proper sequence of their opening and closing movements is observed.

The wobble-plate is shown at an angle of 45 degrees in the cylinder as the cylinder is of a length equal to its diameter but a different angle can be used in case a longer or shorter cylinder is used to co-operate with the cylinder ends to accomplish the same purposes as does a piston by its strokes.

As seen in Figures 5, 6 and 7 the wobble plate in making one half revolution causes the vanes to conform to its angular and then to its upright position, assuming a central sectional point as the point of observation.

The engine as shown is equivalent to a four-cycle engine. The positions at *a* and *b* being those, for instance, when the exhaust is completed as at *a* and the compression is completed as at *b* and similarly, the large chamber at *c* is one in which the explosion has just taken place and its power stroke is complete and *d* is one in which the suction of fuel has just been completed and compression is about to begin. In other words the rotation of the wobble plate transmits its motion to the shaft and it also presents an inclined tilted surface to the explosive mixture. The decrease in the size of the chambers expels the gases when the cycle of rotation causes the wobble plate to approach the conical end of the cylinder.

The vanes which are arranged parallel with the axis of the cylinder and slide and turn in the cylinder walls are held against rotation and act as walls of the chambers. The wobble plate rotates between and through the vanes where they abut on it and they in turn slide to conform to the difference in angle as successive parts of the wobble plate engage them.

Suitable spark plugs 28 are installed with the usual timing and ignition mechanism to explode the mixture at the proper time.

While the engine is shown as an internal combustion engine it can also be used as a steam engine or driven to form a compressor and still come within the terms of this description so long as the rotatable wobble-plate and dividing vanes are used in a cylinder.

I claim:—

1. An engine comprising a cylinder, a wobble-plate rotatably supported in the cylinder, and vanes movable only in a plane parallel to the axis of the cylinder; and moved by the plate and dividing the cylinder longitudinally and a shaft on which the wobble plate is secured.

2. An engine comprising a cylinder, a shaft in the cylinder, a wobble-plate on the shaft and fitting the cylinder, and vanes installed so as to divide the cylinder longitudinally, said vanes being movable in a plane parallel to the axis of the cylinder and a shaft in which the wobble plate is secured.

3. An engine comprising a cylinder, a shaft, a wobble plate on the shaft and fitting the cylinder, vanes dividing the cylinder longitudinally to form compartments, means for supporting the vanes so that they can move with the movement of the wobble plate but held against rotation around the axis of the cylinder, and inlet and exhaust valves for each compartment formed by the plate and the vanes.

4. An engine comprising a cylinder, a wobble-plate rotatably supported in the cylinder and fitting the cylinder, and means accommodating itself to the movement of the wobble-plate and arranged so as to divide the cylinder into halves said vanes being movable only in a plane parallel with the axis of the cylinder whereby with the wobble-plate it forms four chambers, and inlet and exhaust ports in the cylinder and communicating with their respective chambers.

5. An engine comprising a cylinder, a wabble-plate fitting the cylinder, a shaft on which the plate is secured, vanes mounted in the cylinder and fixed against any movement other than a sliding movement in a plane parallel with the axis of the cylinder and dividing it longitudinally and accommodating themselves to the movements of the plate, inlet and exhaust ports to each chamber so formed, valves for closing and opening the said ports, and means operated from the shaft for operating the valves in proper sequence.

6. In an engine, a casing having a cylindrical chamber therein, a wobble plate rotatable in the cylinder, and slidable vanes dividing the chamber in a plane parallel with the axis of rotation of the plate the vanes being movable only in a plane parallel with the axis of the cylindrical chamber and a shaft on which the wobble plate is mounted.

JAMES L. KEMPTHORNE.